United States Patent Office 3,825,509
Patented July 23, 1974

3,825,509
INITIATOR EMULSION FOR OLEFINIC
POLYMERIZATION REACTIONS
Richard K. Miller, Long Beach, Calif., assignor to The
B. F. Goodrich Company, New York, N.Y.
No Drawing. Filed Nov. 13, 1972, Ser. No. 305,855
Int. Cl. C08f 3/30, 15/02, 15/06
U.S. Cl. 260—86.3    7 Claims

ABSTRACT OF THE DISCLOSURE

A free-radical initiator emulsion for use in olefinic polymerization reactions comprising an emulsion of said initiator in a water solution of polyoxyethylene sorbitan monolaurate and polyvinyl alcohol and the process of producing polymers employing said emulsion.

BACKGROUND OF THE INVENTION

In the commercial production of polymers and copolymers of monoolefinic monomers, such as, for example, polymers of vinyl and vinylidene halides, either alone or with other vinylidene monomers having a terminal $$CH_2=C<$$

group, or with polyolefinic monomers, the polymers are produced in the form of discrete particles by polymerization in suspension in water. Such polymerization reactions are conducted in the presence of a suitable catalyst or initiator.

Many of the initiators for said polymerization reactions, such as, for example, diisopropyl peroxy percarbonate, when used by themselves, are difficult and dangerous to handle. It is the present practice in the art to dissolve the initiator in an organic solvent, such as hexane or xylene, to facilitate handling and storage thereof. However, when using such an organic solvent it has a tendency to remain in the polymer being produced which, in turn, makes drying of the polymer more difficult. Further, due to the flammability of such organic solvents, removal thereof from the polymer is dangerous and costly. Also, the flammability of organic solvents presents a serious safety problem in storage and handling when they are used as carriers for unstable initiators. Accordingly, since the polymerization reaction takes place in a suspension system in water, a water-soluble or a water-emulsifiable initiator would provide the safety and also eliminate the disadvantages of a flammable difficulty removable solvent.

In the aqueous suspension polymerization of olefinic monomers, the reaction is usually conducted at elevated temperatures under pressure. Many initiators used in such polymerization reactions will decompose rapidly if added to the reactor charge water at these temperatures and pressures. Therefore, it would be advantageous to provide a means of charging such initiators to the reaction medium in such a way as to eliminate the expense associated with safely charging unstable initiators to pressurized reactors.

SUMMARY OF THE INVENTION

In accordance with the present invention, the above and other difficulties are avoided by forming a free-radical polymerization initiator or catalyst emulsion or dispersion in an aqueous solution of polyoxyethylene sorbitan monolaurate and polyvinyl alcohol. In the preparation of said emulsion the polyvinyl alcohol is dissolved in water with agitation and the polyoxyethylene sorbitan monolaurate is then added thereto and stirred until solution is complete. Thereafter the initiator or catalyst is added to the solution as rapidly as possible and stirring or mixing continued until the emulsification of the initiator is complete. The emulsion of the initiator, made up in a concentration suitable to provide the needed amount of initiator for the polymerization reaction, is charged to the olefinic polymerization reaction vessel in the same manner as any other water based solution is now charged in present-day commercial practice.

DETAILED DESCRIPTION OF THE INVENTION

The free-radical initiator or catalyst emulsion or dispersion of the present invention is particularly adapted for use in those polymerization reactions which are conducted in an aqueous medium, such as dispersion or suspension polymerization and emulsion polymerization reactions. The invention is particularly adapted for use in the aqueous suspension polymerization of vinyl chloride, either alone or with other vinylidene monomers having at least one terminal $$CH_2=CH<$$

grouping. While the present invention is specifically illustrated hereinafter in connection with the suspension polymerization of vinyl chloride, it is to be understood that this is merely for purposes of simplicity and that the free-radical initiator emulsion or dispersion of the present invention may likewise be employed in the polymerization in aqueous dispersion or suspension of any polymerizable ethylenically unsaturated monomer or monomers, either alone or in admixture with each other. Examples of such monomers are other vinyl halides and vinylidene halides, such as vinyl bromide, vinyl fluorides, vinylidene chloride, vinylidene fluoride, etc.; vinylidene monomers having at least one terminal $$CH_2=CH<$$

grouping, such as esters of acrylic acid, for example, methyl acrylate, ethyl acrylate, butyl acrylate, octyl acrylate, cyanoethyl acrylate, and the like; esters of methacrylic acid, such as methyl methacrylate, butyl methacrylate, and the like; styrene and styrene derivatives including α-methyl styrene, vinyl toluene, chlorostyrene, and the like; acrylonitrile, ethyl vinyl benzene, vinyl acetate, vinyl naphthalene, etc.; di-olefins including butadiene, isoprene, chloroprene, and the like, and other vinylidene monomers of the types known to those skilled in the art.

As previously pointed out, the present invention is particularly applicable to the suspension polymerization of vinyl chloride, either alone or in admixture with one or more other vinylidene monomers copolymerizable therewith in amounts as great as about 80% or more by weight, based on the weight of the monomer mixture.

Among the initiators or catalysts which may be suitably emulsified or dispersed in the water solution of polyoxyethylene sorbitan monolaurate and polyvinyl alcohol are the alkanoyl, aroyl, alkaroyl and aralkanoyl diperoxides and mono-hydroperoxides, azo compounds, peroxy-esters, percarbonates, and the like. Illustrative of such catalysts are benzoyl diperoxide, lauryl diperoxide, diacetyl peroxide, cumene hydroperoxides, methyl ethyl ketone peroxide, diisopropylbenzene hydroperoxide, 2,4-dichlorobenzoyl peroxide, naphthoyl peroxide, acetyl cyclohexane sulfonyl peroxide, t-butyl perbenzoate, di-t-butyl perphthalate, diisopropyl peroxydicarbonate, di( sec-butyl) peroxydicarbonate, and the like, azo-bis-isobutyronitrile, alpha, alpha'-azodiisobutyrate, and the like. The choice of any particular free-radical catalyst or initiator is dictated in part by the particular monomer or monomers to be polymerized, by the color requirements of the polymer, and, to some extent, by the temperature of polymerization to be employed.

In making the initiator or catalyst emulsion or dispersion of the present invention the polyvinyl alcohol is first dissolved in water usually at a temperature of about 100° to 160° F. A concentration of about 1% to about 5% by weight of polyvinyl alcohol is sufficient for the purposes of this invention, with a concentration of about 2% to 3% by weight being preferred. After complete dissolution of the polyvinyl alcohol (hereinafter "PVA") in water the polyoxyethylene sorbitan monolaurate (hereinafter "Tween") is added. Prior to such addition, however, the PVA solution is cooled to a temperature of 100° F. or less since separation will occur at higher temperatures. The mixture is agitated for sufficient time to obtain complete solution. Usually a concentration of Tween in the range of 1% to about 6% by weight is satisfactory for the purposes of this invention.

Prior to the addition of the catalyst or initiator, the solution of PVA and Tween should be cooled to a temperature in the range of about 40° F. to 50° F. Thereafter, the catalyst is added as quickly as possible and the mixture agitated for at least 30 minutes to insure adequate emulsion or dispersion of the catalyst. The catalyst is employed in the emulsion or dispersion in any amount up to about 19% by weight based on the total weight of the emulsion. At concentrations higher than this the viscosity is too great and the emulsion is difficult to handle. Generally, the viscosity of the emulsion should be below 250 centipoises to insure best results and ease of handling. It is preferred to employ emulsions or dispersions containing from about 10% to 16% by weight of catalyst.

The materials employed in the polymerization process of the present invention are charged into a polymerization chamber, which may be any of the polymerization receptacles commonly used for such reactions. The polymerization chamber is first purged with nitrogen, or evacuated, to remove all traces of air. Thereafter, the materials to be used in the reaction are charged to the polymerization chamber in the following manner: first, the reaction medium or water is added and then the dispersant, if one is employed, is added to the water with agitation or stirring. If desired, and for convenience, the water and dispersant may be admixed before charging. It is the usual practice to next add the monomer or monomers to be polymerized with continued agitation. Then the catalyst emulsion is added to the reactor. Thus, the expense and danger associated with charging organic solvent solutions of unstable initiators to pressurized reactors are eliminated.

After the addition of the monomer or monomers, the temperature of the reactor ingredients will normally be in the range of 25° C. to about 70° C. The polymerization receptacle is jacketed so that cooling or heating media can be passed therethrough in order to maintain the temperature of the polymerizer ingredients at the appropriate and predetermined level, both prior to and during the polymerization reaction. Usually the temperature of the polymerization reaction will be in the range of 45° C. to about 70° C. To a great extent, the particular temperature employed will depend upon the particular vinylidene monomer or monomers being polymerized.

The polymerization receptacle is equipped with a cap or manhead having an opening extending therethrough in which appropriate means are inserted for injecting materials into the reaction medium, such as, for example, a pressure charge bottle or receptacle. The catalyst or initiator emulsion is added to the polymerization reaction medium by injection the same into the chamber through the cap or manhead. The initiator emulsion may be added all at once or in increments during the polymerization reaction. In many reactions it may be desirable to add the initiator emulsion in a continuous manner over a predetermined period of time. The mode of addition of the initiator emulsion of the present invention will depend a great deal upon the particular catalyst employed and the rate of polymerization of the particular vinylidene monomer or monomers being polymerized, as well as the rate of conversion, and percent of conversion, desired in any particular polymerization reaction.

The present invention will be further described in the specific examples which follow hereinafter, it being understood that this is by way of illustration and not limitation. In the examples, all parts and percentages are by weight unless otherwise indicated.

EXAMPLE I

A catalyst emulsion was made up at follows: 3 parts of polyvinyl alcohol were added to 100 parts of water at 100° F. with agitation. The temperature was then raised to 150° F. and agitation continued until solution was complete. The solution was then cooled to 75° F. and 4 parts of polyoxyethylene sorbitan monolaurate were added with agitation. The solution was then further cooled to 50° F. To the cooled solution there was added 20 parts of di sec-butyl peroxydicarbonate and agitation was continued until an emulsion was formed. A uniform stable emulsion was obtained in less than 30 minutes. Excellent chemical stability of the catalyst was maintained when the emulsion was stored at temperatures in the range of 35° to 45° F.

EXAMPLE II

In this Example there is demonstrated the cold reactor charging of the catalyst emulsion. 200 parts of water were charged to a polymerization vessel, in the usual manner, at a temperature of 30° C. There was then added to the vessel, with agitation, sufficient amount of a 1% aqueous solution of methyl cellulose to give in the reactor 0.04 part of methyl cellulose, based on the weight of monomer to be added. Sufficient amount of the emulsion of Example I (20% emulsion of di sec-butyl peroxydicarbonate) was then added to the reaction vessel to give 0.03 part of catalyst therein, based on the weight of the monomer. The reaction vessel was then sealed and evacuated and thereafter, 100 parts of vinyl chloride were charged to the vessel. The temperature in the vessel was raised to 70° C., with agitation, and the polymerization reaction was continued to completion. The polymer obtained had excellent properties and no difficulties were encountered in addition of catalyst and uniform dispersion thereof throughout the reaction medium.

EXAMPLE III

In this Example there is demonstrated the hot reactor charging of the catalyst emulsion. 200 parts of water were charged to a polymerization reactor, in the usual manner, at a temperature of 70° C. There was then added to the reactor, with agitation, 0.04 part of methyl cellulose in the form of a 1% aqueous solution. The reactor was then evacuated and 0.03 part of di sec-butyl peroxydicarbonate, in the form of a 20% emulsion, as described in Example I, was vacuumed into the reactor with continuing agitation followed by the addition of 100 parts of vinyl chloride. The temperature in the reactor was maintained at 70° C. and the polymerization reaction was continued to completion. The polymer produced had good properties. No difficulties were encountered in the addition of the catalyst emulsion even though vacuum charged to the reactor. In this Example, as well as in Example II, drying of the polymer was greatly facilitated due to the absence of organic solvents in the polymerization medium.

It will readily be apparent, from the above description and examples, that one primary advantage of the present invention is the elimination of the use of organic solvents in polymerization reactions as carriers for initiators or catalysts and the ease of drying the resultant polymers. Removal of organic solvents from the polymer is eliminated and thus also the danger of fire due to the flammability of said solvents, which, in turn, reduces the cost of the polymer production. Importantly the catalyst emulsions of the present invention are capable of being safely stored as such with or without agitation for appropriate periods of time commensurate with efficient plant operation. Another advantage of the emulsion system of the present invention is the improved chemical stability or decreased rate of decomposition of the initiator or catalyst, primarily at ambient temperatures, thus eliminating the danger of explosive decomposition in the event of storage refrigeration failure, and the like. Many other advantages of the present invention will be readily apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

I claim:

1. In a process for aqueous suspension polymerization of vinyl chloride alone or in admixture with one or more other vinylidene monomers copolymerizable therewith in amounts as great as about 80% or more by weight, based on the weight of the monomer mixture, the improvement which comprises adding a free-radical polymerization catalyst to the aqueous suspension polymerization reaction in the form of an emulsion of said catalyst in an aqueous solution containing from about 1% to about 5% by weight of polyvinyl alcohol and from about 1% to about 6% by weight of polyoxyethylene sorbitan monolaurate, said catalyst being employed in said emulsion in any amount up to about 19% by weight, based on the total weight of the emulsion, and being selected from the group consisting of alkanoyl, aroyl, alkaroyl and aralkanoyl diperoxides and mono-hydroperoxides, azo compounds, peroxy-esters, and percarbonates.

2. A process as defined in claim 1 wherein vinyl chloride is homopolymerized.

3. A process as defined in claim 1 wherein vinyl chloride is copolymerized with ethyl acrylate.

4. A process as defined in claim 1 wherein the catalyst is di (sec-butyl) peroxydicarbonate.

5. A process as defined in claim 1 wherein the catalyst is acetyl cyclohexane sulfonyl peroxide.

6. A process as defined in claim 2 wherein the catalyst is di (sec-butyl) peroxydicarbonate.

7. A process as defined in claim 2 wherein the catalyst is acetyl cyclohexane sulfonyl peroxide.

References Cited

UNITED STATES PATENTS 2,890,199   6/1959   McNulty et al. ____ 260—92.8 W

HARRY WONG, JR., Primary Examiner

U.S. Cl. X.R.

260—87.5 R, 88.7 A, 88.7 D, 98.5 A, 91.5, 91.7, 92.1 R, 92.8 W, 93.5 W, 94.2 R